US008762922B1

(12) United States Patent
Roy et al.

(10) Patent No.: US 8,762,922 B1
(45) Date of Patent: Jun. 24, 2014

(54) SYSTEM FOR REDUCING LEAKAGE POWER OF ELECTRONIC CIRCUIT

(71) Applicants: Amit Roy, Noida (IN); Vijay Tayal, Noida (IN); Chetan Verma, Noida (IN)

(72) Inventors: Amit Roy, Noida (IN); Vijay Tayal, Noida (IN); Chetan Verma, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/052,764

(22) Filed: Oct. 13, 2013

(51) Int. Cl.
*G06F 17/50* (2006.01)

(52) U.S. Cl.
CPC .................................. *G06F 17/5081* (2013.01)
USPC ............ 716/132; 716/133; 716/134; 716/135

(58) Field of Classification Search
USPC .................................................. 716/132–135
See application file for complete search history.

(56) References Cited

U.S. PATENT DOCUMENTS

| | | | |
|---|---|---|---|
| 4,698,760 A | 10/1987 | Lembach | |
| 4,827,428 A | 5/1989 | Dunlop | |
| 5,179,298 A | 1/1993 | Hirano | |
| 5,612,636 A | 3/1997 | Ko | |
| 6,397,170 B1 | 5/2002 | Dean | |
| 6,668,358 B2 * | 12/2003 | Friend et al. | 716/103 |
| 7,448,009 B2 | 11/2008 | Pundoor | |
| 7,689,942 B2 * | 3/2010 | Acar et al. | 716/134 |
| 7,802,217 B1 * | 9/2010 | Gopinath et al. | 716/109 |
| 7,814,339 B2 | 10/2010 | Monferrer | |
| 7,849,422 B2 | 12/2010 | Seferrazza | |
| 8,196,086 B2 * | 6/2012 | Brown et al. | 716/133 |
| 8,225,248 B2 * | 7/2012 | Chen et al. | 716/106 |
| 8,271,931 B2 * | 9/2012 | Chen et al. | 716/133 |
| 8,281,275 B2 * | 10/2012 | Tirumala | 716/133 |
| 8,490,043 B2 * | 7/2013 | Gupta et al. | 716/132 |
| 8,527,935 B1 | 9/2013 | Verma | |
| 2003/0163792 A1 | 8/2003 | Chang | |
| 2007/0094623 A1 * | 4/2007 | Chen et al. | 716/4 |
| 2010/0153897 A1 * | 6/2010 | Zahn | 716/9 |
| 2011/0093830 A1 * | 4/2011 | Chen et al. | 716/132 |
| 2011/0231811 A1 * | 9/2011 | Tang et al. | 716/132 |
| 2012/0066658 A1 * | 3/2012 | Chowdhury et al. | 716/120 |
| 2012/0131531 A1 * | 5/2012 | Tirumala | 716/113 |

* cited by examiner

*Primary Examiner* — Naum Levin
(74) *Attorney, Agent, or Firm* — Charles Bergere

(57) ABSTRACT

A system for reducing leakage power of an electronic circuit design, where the circuit design includes multiple timing paths, each timing path made up of multiple cells, using an electronic design automation (EDA) tool. The EDA tool includes a processor that chooses a first replacement cell for replacing a first cell in a first timing path when timing slack is not available in the first path, where a width and threshold voltage of the first replacement cell are greater than a width and threshold voltage of the first cell. The processor then replaces the first cell with the first replacement cell when the overall power consumption of the first replacement cell is less than that of the first cell, and when the timing slack is available for replacing the first cell with the first replacement cell.

14 Claims, 4 Drawing Sheets

SYSTEM FOR REDUCING LEAKAGE POWER OF ELECTRONIC CIRCUIT

BACKGROUND OF THE INVENTION

The present invention relates generally to electronic circuits and electronic circuit design, and, more particularly to a system for reducing leakage power of an electronic circuit.

Electronic circuits are designed using multiple building blocks known as cells. A cell is a digital logic element that performs a specific function. Examples of cells include various logic gates, such as AND, OR, XOR, NOT, and counterparts like NAND, NOR and XNOR. Each cell in a circuit must meet timing constraints, i.e., the cell must provide an output before a predefined time period elapses. A cell is said to have timing slack when a delay in its output does not affect an overall delay of the electronic circuit. For example, if a cell requires a minimum of 5 nanoseconds to generate an output and the electronic circuit requires the signal from the cell to be output within 10 nanoseconds, then the cell is said to have a timing slack of 5 nanoseconds.

The total power consumption of an electronic circuit is a sum of the dynamic power and leakage power of each cell of the circuit. The dynamic power is the power consumed by the cell while performing its desired function and the leakage power is the power consumed by the cell due to unintended leakage of power from the cell. The leakage power depends on a threshold voltage of the cell, where the higher the threshold voltage, the lower the leakage power. However, higher threshold voltage degrades the speed of the cell, which reduces or consumes the timing slack (if any) of the cell.

One technique to reduce leakage power is to identify cells having timing slack and replace them with corresponding cells having a higher threshold voltage. Although this technique reduces the leakage power of the circuit without compromising speed, it fails when the cells do not have timing slack.

Therefore, it would be advantageous to be able to reduce leakage power as well as overall power consumption but does not does not degrade the operational speed of the circuit, and that overcomes the above-mentioned limitations of existing systems for reducing leakage power of electronic circuits.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
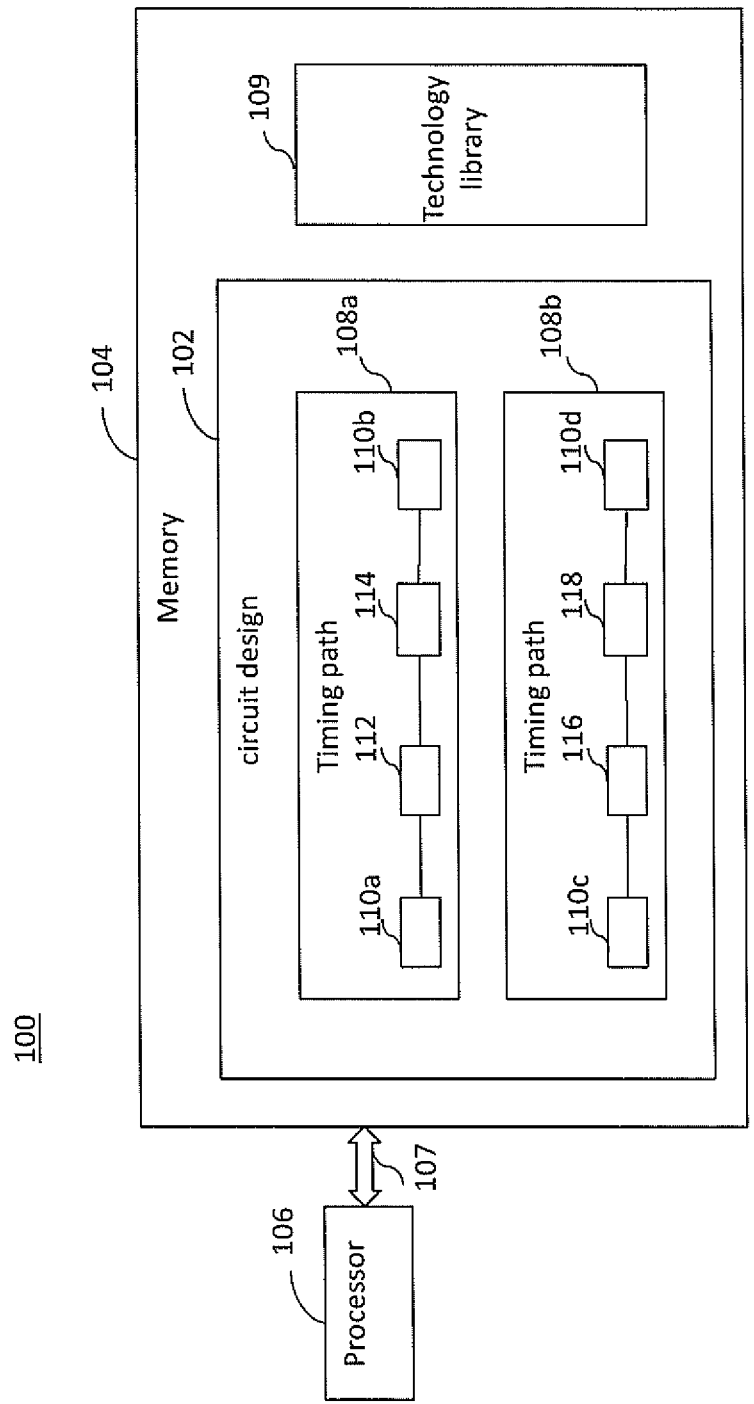
FIG. 1 is a schematic block diagram of an electronic design automation (EDA) tool for reducing leakage power of an electronic circuit design in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an electronic design automation (EDA) tool for reducing leakage power of an electronic circuit design is provided. The electronic circuit design includes a plurality of timing paths made up of a plurality of cells. The EDA tool includes a memory that stores the electronic circuit design and a processor in communication with the memory. The processor selects a first timing path of the plurality of timing paths, determines availability of timing slack for replacing a first cell of the first timing path and chooses a first replacement cell from a technology library of the EDA tool when the timing slack is not available, where the type of the first replacement cell is the same as the type of the first cell and a width and threshold voltage of the first replacement cell are greater than a width and threshold voltage of the first cell. The processor further compares the overall power consumption of the first cell and the first replacement cell, determines availability of timing slack for replacing the first cell with the first replacement cell when the overall power consumption of the first replacement cell is less than the overall power consumption of the first cell, and replaces the first cell with the first replacement cell.

Various embodiments of the present invention provide a system and method for reducing leakage power of an electronic circuit design that includes a plurality of cells, using an electronic design automation (EDA) tool. The circuit design includes a plurality of cells. The EDA tool includes a memory that stores the circuit design, a technology library and a processor. The processor chooses a first replacement cell from the technology library for replacing a first cell of the plurality of cells when timing slack is not available for the first cell where the width and threshold voltage of the first replacement cell are greater than a width and threshold voltage of the first cell. The processor then replaces the first cell with the first replacement cell when the overall power consumption of the first replacement cell is less than that of the first cell and timing slack is created for replacing the first cell with the first replacement cell. As compared to the first cell, the selected first replacement cell has increased operational speed because of an increased width, and a lower leakage power due to a higher threshold voltage. Therefore, the EDA tool replaces the first cell with the first replacement cell even if timing slack is not available for the first cell. The EDA tool repeats the above process for all of the cells of the circuit design, thereby reducing leakage power and overall power consumption of the circuit design.

Referring now to FIG. 1, a schematic block diagram of an electronic design automation (EDA) tool 100 for reducing leakage power of an electronic circuit design 102 in accordance with an embodiment of the present invention is shown. The EDA tool 100 includes a memory 104 and a processor 106 in communication with the memory 104, such as by way of a bus 107. The memory 104 stores the electronic circuit design 102 that includes a plurality of timing paths 108 of which first and second timing paths 108a and 108b are shown. The memory 104 further stores a technology library 109. Examples of the electronic circuit design 102 include microprocessor, microcontroller unit (MCU), system-on-chip (SOC), and application specific integrated circuit (ASIC) designs.

The processor 106 and the memory 104 comprise a computer system that can range from a stand-alone personal computer to a network of processors and memories, to a mainframe system. The computer system must be able to run verification tools that can simulate digital and analog circuits, such as Incisive™ Unified Simulator (IUS) by Cadence Design Systems, Inc. Such tools and computer systems are known to those of skill in the art.

The first timing path 108a includes a first launch flip-flip 110a and a first capture flip-flop 110b, and a plurality of cells connected therebetween, of which first and second cells 112 and 114 are shown. Similarly, the second timing path 108b includes a second launch flip-flop 110c and a second capture flip-flop 110d, and a plurality of cells connected therebetween, of which third and fourth cells 116 and 118 are shown. During functional simulation of the electronic circuit design 102, the processor 106 launches data (defined by externally generated functional test patterns) for simulating the first timing path 108a by way of the first launch flip-flop 110a. The data shifts across the first and second cells 112 and 114 and is eventually captured by the first capture flip-flop 110b. Similarly, data for testing the second timing path 108b is launched by way of the second launch flip-flop 110c, which shifts across the third and fourth cells 116 and 118 and is captured by the second capture flip-flop 110d.

A type of each of the first through fourth cells 112-118 may include an AND gate, an OR gate, a NOT gate, a NOR gate, a NAND gate, a XOR gate, a XNOR gate, and a combinational logic. The technology library 109 stores instances of each cell type and multiple variants of each cell type. The multiple variants of a same cell type may differ in threshold voltage and width and are represented by SVt(x), HVt(x), HVt(x+), SVt(x+), HVt(x++) or HVt(x+++), where:

SVt(x)=variant cell having a standard threshold voltage and width,
SVt(x+)=variant cell having a width greater than that of the SVt(x) and a threshold voltage same as SVt(x),
HVt(x)=variant cell having a width same as SVt(x) and a threshold voltage higher than that of SVt(x),
HVt(x+)=variant cell having a width greater than that of the HVt(x) and a threshold voltage same as HVt(x),
HVt(x++)=variant cell having a width greater than that of the HVt(x+) and a threshold voltage same as HVt(x+), and
HVt(x+++)=variant cell having a width greater than that of the HVt(x++) and threshold voltage same as HVt(x++).

Figure 2:
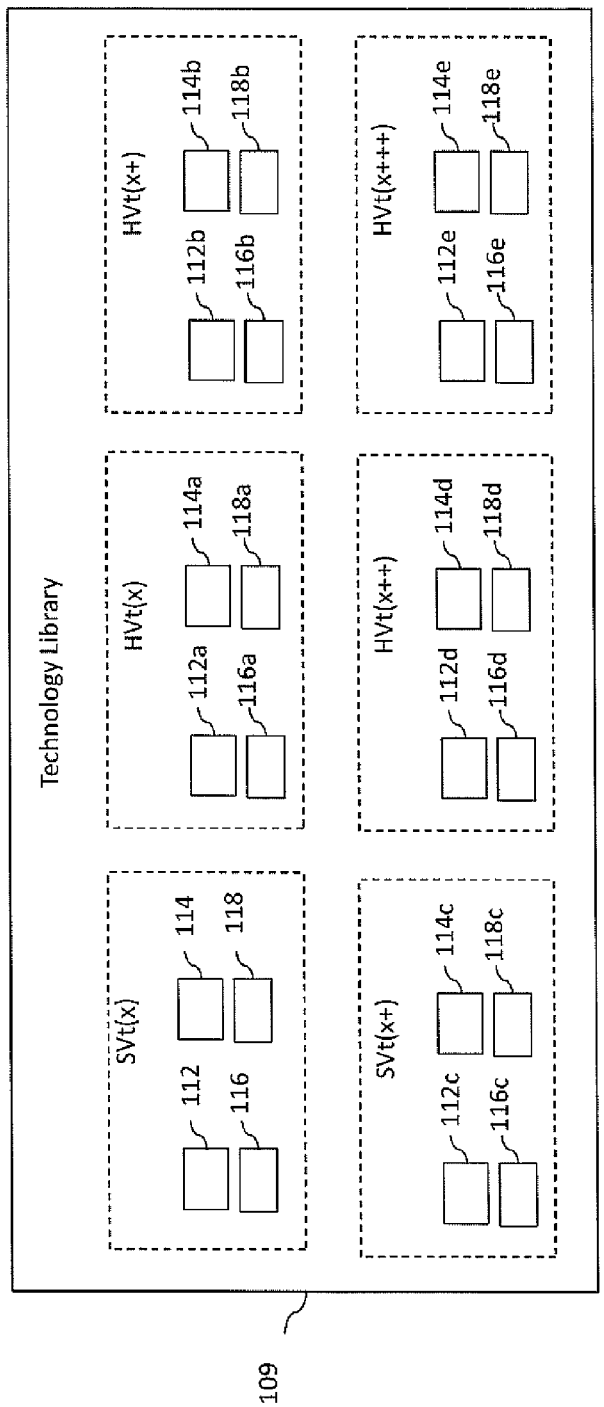
FIG. 2 is a schematic block diagram of a technology library of the EDA tool of FIG. 1.

During functional simulation of the electronic circuit design 102, the processor 106 chooses the cell variants from the technology library 109 for replacing cells of the electronic circuit design 102 as required for reducing the power consumption. The variant cells are hereinafter referred to as replacement cells. An example of the technology library 109 is shown in FIG. 2. The technology library 109 stores instances of the first through fourth cells 112-118 of type SVt(x), first replacement cells 112a-118a of type HVt(x) corresponding to the first through fourth cells 112-118 respectively, second replacement cells 112b-118b of type HVt(x+) corresponding to the first through fourth cells 112-118 respectively, third replacement cells 112c-118c of type SVt(x+) corresponding to the first through fourth cells 112-118 respectively, fourth replacement cells 112d-118d of type HVt(x++) corresponding to the first through fourth cells 112-118 respectively, and fifth replacement cells 112e-118e of type HVt(x++) corresponding to the first through fourth cells 112-118 respectively.

In operation, an external test pattern generator (not shown) generates and provides test patterns to the EDA tool 100 for simulating the electronic circuit design 102. Based in the test patterns, the processor 106 selects a timing path, for example, the first timing path 108a, and checks if the first cell 112 (of type SVt(x)) has a timing slack available for replacing by the first replacement cell 112a (of type HVt(x)). If the timing slack is available, the processor 106 chooses the first replacement cell 112a from the technology library 109 and replaces the first cell 112 with the first replacement cell 112a. If the timing slack is not available, the processor 106 chooses the second replacement cell 112b of type HVt(x+) from the technology library 109 to replace the first cell 112. Thereafter, the processor 106 checks whether the first cell 112 and the second replacement cell 112b meet the criterion given by the inequality (1) below:

$$(((SVt(x)\text{cap} - HVt(x+)\text{cap})/SVt(x)\text{cap})*\text{dynamic power (org)} + ((SVt(x)\text{leak} - HVt(x+)\text{leak})/SVt(x)\text{leak}) *\text{leakage power (org)}) > 0 \quad (1)$$

where,
SVt(x) cap=Dynamic power of the first cell 112,
HVt(x+) cap=Dynamic power of the second replacement cell 112b,
SVt(x)leak=Leakage power of the first cell 112,
HVt(x+)leak=Leakage power of the second replacement cell 112b,
dynamic power (org)=Percentage of dynamic power in the electronic circuit design 102, and
leakage power (org)=Percentage of leakage power in the electronic circuit design 102.

The term '(SVt(x)cap−HVt(x+)cap)' has a negative value if the dynamic power of the second replacement cell 112b is greater than that of the first cell 112 due to an increased width. The term '(SVt(x)leak−HVt(x+)leak)' has a positive value if the leakage power of the second replacement cell 112b is less than that of the first cell 112 due to an increased threshold voltage. The criterion of the inequality (1) is met when an overall increase in dynamic power of the first cell 112 is less than an overall decrease in leakage power. Further, when the first cell 112 and the second replacement cell 112b satisfy the criterion of the inequality (1), an overall power consumption of the second replacement cell 112b may be safely assumed to be less than that of the first cell 112.

When the overall power consumption of the second replacement cell 112b is less than the overall power consumption of the first cell 112, replacing the first cell 112 with the second replacement cell 112b may not lead to an increase in the overall power consumption of the electronic circuit design 102. The processor 106 then checks if timing slack is available for replacing the first cell 112 with the second replacement cell 112b, and if available, replaces the first cell 112 with the second replacement cell 112b. In an embodiment of the present invention, the processor 106 first replaces the first cell 112 with the third replacement cell 112c (of type SVt(x+) and also known as first intermediate replacement cell) to create the timing slack and subsequently replaces the third replacement cell 112c with the second replacement cell 112b.

If the timing slack is not available, the processor 106 chooses the fourth replacement cell 112d of type HVt(x++) from the technology library 109 and compares an overall power consumption of the first cell 112 and the fourth replacement cell 112d by using the inequality (1). If the overall power consumption of the fourth replacement cell 112d is less than that of the first cell 112, the processor 106 checks if a timing slack is available for replacing the first cell 112 with the fourth replacement cell 112d, and if available, replaces the first cell 112 with the fourth replacement cell 112d.

If the timing slack is not available, the processor 106 chooses the fifth replacement cell 112e of type HVt(x+++) from the technology library 109 for replacing the first cell 112. If the overall power consumption of the fifth replacement cell 112e is less than that of the first cell 112, the processor 106 checks if a timing slack is available for replacing the first cell 112 with the fifth replacement cell 112e, and if available, replaces the first cell 112 with the fifth replacement cell 112e.

If the timing slack is not available, the processor 106 repeats the above process iteratively until it finds a suitable replacement cell for the first cell 112 and upon finding, the processor 106 proceeds to the second cell 114 (of type SVt(x)) for replacing by one of corresponding first through fifth replacement cells 114a-114e.

Further, if the processor 106 determines that the overall power consumption of the second, fourth, or fifth replacement cells 112b, 112d or 112e is greater than that of the first cell 112, the first cell 112 is considered to be not eligible for replacement as it may lead to an increase in an overall power consumption of the electronic circuit design 102. In such a case, the processor 106 proceeds to the second cell 114 without replacing the first cell 112. The processor 106, thus, repeats the abovementioned process for all of the timing paths the electronic circuit design 102, thereby reducing the leakage power and reducing power consumption of the electronic circuit design 102.

Figure 3:
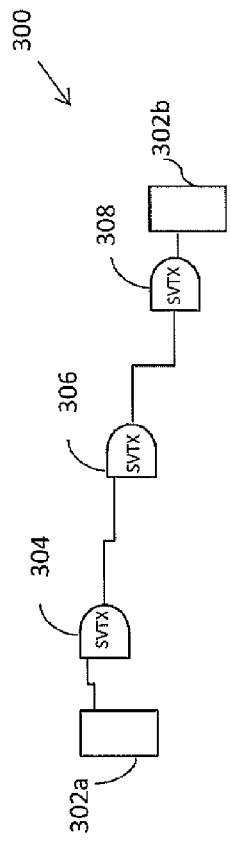
FIG. 3 is a schematic block diagram of an exemplary electronic circuit for illustrating reduction of leakage power, in accordance with an embodiment of the present invention.

FIG. 3 shows a schematic block diagram of an exemplary electronic circuit design 300. The electronic circuit design 300 includes first and second flip-flops 302a and 302b, and first through third AND gates 304-308 of type SVt(x). The technology library 109 stores a mapping between each cell variant of the first through third AND gates 304-308 and corresponding widths and threshold voltages, in the form of a look-up table (LUT). A portion of the LUT which illustrates mapping between threshold voltages and widths of first through fifth replacement cells 304a-304e corresponding to the first AND gate 304 is shown in the table A below:

TABLE A

Look-up table (LUT)

| Cell | Cell Type | Variant Type | Threshold Voltage | Cell Width |
|------|-----------|--------------|-------------------|------------|
| 304  | AND       | SVt (x)      | X                 | A          |
| 304a | AND       | HVt (x)      | $Z = X + \sigma X$ | A          |
| 304b | AND       | HVt (x+)     | $Y = Z + \sigma Z$ | $B = A + \sigma A$ |
| 304c | AND       | SVt (x+)     | $X + \sigma X$    | $B = A + \sigma A$ |
| 304d | AND       | HVt (x++)    | $W = Y + \sigma Y$ | $C = B + \sigma B$ |
| 304e | AND       | HVt (x+++)   | $V = W + \sigma W$ | $D = C + \sigma C$ |

In the table A, variables V, W, X, Y and Z represent the exemplary threshold voltage values and variables A, B, C and D represent the exemplary cell width values. $\sigma$ represents the incremental factor for these variables.

The processor 106 chooses the first AND gate 304 and replaces the first AND gate 304 (of type SVt(x)) with the first replacement cell 304a (of type HVt(x)) if timing slack is available for the first AND gate 304. If the timing slack is not available, the processor 106 compares an overall power consumption of the first AND gate 304 and the second replacement cell 304b (of type HVt(x+)) by using inequality (1). If the overall power consumption of the second replacement cell 304b is less than that of the first AND gate 304, the processor 106 checks if a timing slack is available for replacing the first AND gate 304 with the second replacement cell 304b, and if available, replaces the first AND gate 304 with the second replacement cell 304b.

If the timing slack is not available, the processor iterates the above process using the fourth and fifth replacement cells 304d and 304e of the first AND gate 304, until it finds a suitable replacement for the first AND gate 304, and upon finding, the processor 106 proceeds to the second AND gate 306 (of type SVt(x)). If the overall power consumption of the second, fourth, or fifth replacement cells 304b, 304d or 304e is greater than that of the first AND gate 304, the processor 106 proceeds to the second AND gate 306 without replacing the first AND gate 304.

Figure 4A:
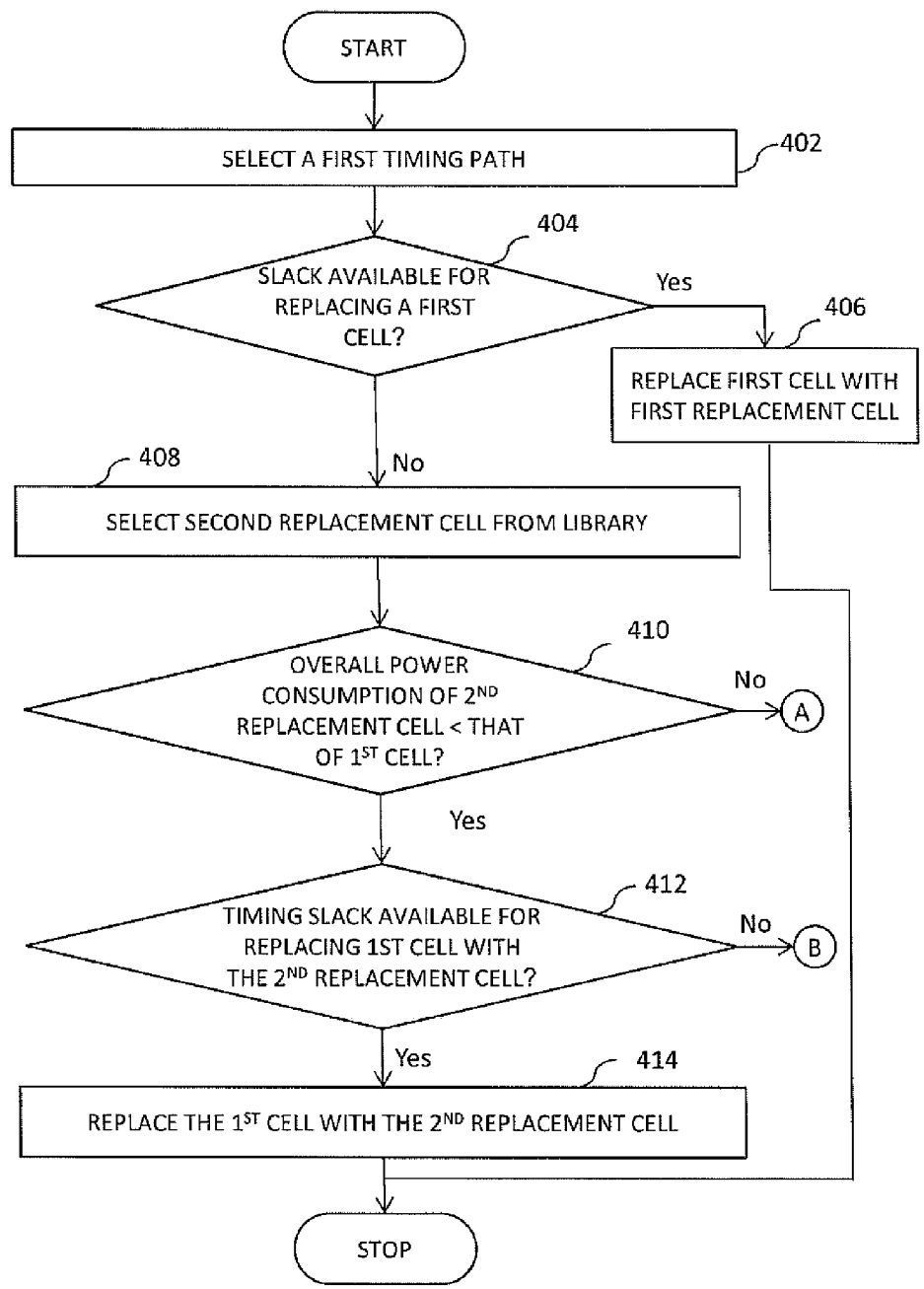
FIGS. 4A and 4B are a flow chart illustrating a method for reducing leakage power of an electronic circuit design in accordance with an embodiment of the present invention.
Figure 4B:
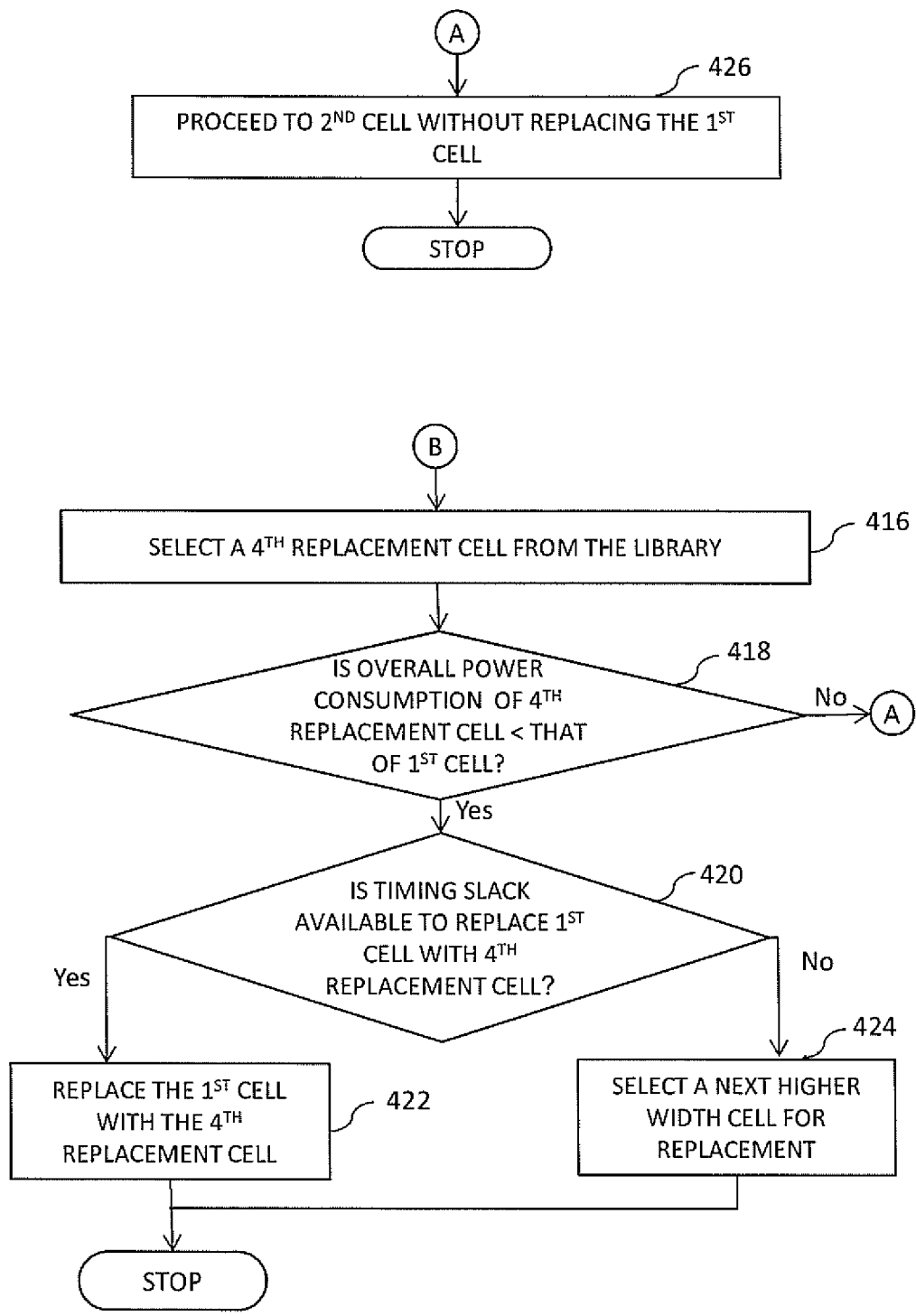

Referring now to FIGS. 4A and 4B, a flow chart illustrating a method for reducing leakage power of the electronic circuit design 102 in accordance with an embodiment of the present invention is shown. At step 402, the processor 106 selects a first timing path 108a of the plurality of timing paths 108. At step 404, the processor 106 checks if a timing slack is available for replacing the first cell 112 (of type SVt(x)) with the first replacement cell 112a (of type HVt(x)). If the timing slack is available, then at step 406, the processor 106 replaces the first cell 112 with the first replacement cell 112a.

If the timing slack is not available, then at step 408, the processor 106 chooses the second replacement cell 112b (of type HVt(x+)) from the technology library 109. At step 410, the processor 106 checks whether an overall power consumption of the second replacement cell 112b is less than that of the first cell 112 by using the inequality (1). If the overall power consumption of the second replacement cell 112b is less than that of the first cell 112, then at step 412, the processor 106 checks if a timing slack is available for replacing the first cell 112 with the second replacement cell 112b. At step 414, the processor 106 replaces the first cell 112 with the second replacement cell 112b if the timing slack is available.

If the timing slack is not available, then at step 416, the processor 106 chooses the fourth replacement cell 112d (of type HVt(x++)) from the technology library 109. Further at step 418, the processor 106 checks whether the overall power consumption of the fourth replacement cell 112d is less than that of the first cell 112. If the overall power consumption of the fourth replacement cell 112d is less than that of the first cell 112, then at step 420, the processor 106 checks if timing slack is available for replacing the first cell 112 with the fourth replacement cell 112d. At step 422, the processor 106 replaces the first cell 112 with the fourth replacement cell 112d if the timing slack is available.

If the timing slack is not available, then at step 424, the processor 106 chooses the next replacement cell that has a higher width and iterates the above process until it finds a suitable replacement cell for the first cell 112 and upon finding, the processor 106 proceeds to the second cell 114 (of type SVt(x)) and repeats the abovementioned process to check possibilities of replacing the second cell 114 with corresponding first through fifth replacement cells 114a-114e.

Further, when the overall power consumption of the second, fourth, or fifth replacement cells 112b, 112d or 112e is greater than that of the first cell 112, then at step 426, the processor 106 skips the first cell 112 and proceeds to the second cell 114, because replacing the first cell 112 may lead to an increase in the overall power consumption of the electronic circuit design 102. The processor 106, thus, repeats the abovementioned process for each timing path 108 of the electronic circuit design 102, thereby reducing the power consumption of the electronic circuit design 102.

It should be noted that in the foregoing description, the EDA tool, i.e., the system and method for reducing leakage power of the present invention, operates on a circuit design stored in a memory; the tool replaces cells in the design according to the above-described algorithm, so that when a circuit is fabricated, such as on a silicon wafer, the fabricated circuit will have low power consumption. Thus, a given circuit design is transformed by the tool into a circuit design of a circuit with reduced leakage power. Of course, this transformation will be readily apparent to those of skill in the art.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for reducing leakage power of an electronic circuit design, wherein the circuit design includes a plurality of cells interconnected to form a plurality of timing paths, the EDA tool comprising:
a memory that stores the circuit design; and
a processor in communication with the memory, wherein the processor:
selects a first timing path of the plurality of timing paths of the circuit design;
determines availability of timing slack for replacing a first cell in the first timing path;
selects a first replacement cell from a technology library when the timing slack is not available, wherein a type of the first replacement cell is the same as a type of the first cell and a width and threshold voltage of the first replacement cell are greater than the width and threshold voltage of the first cell;
compares an overall power consumption of the first cell and the first replacement cell;
determines availability of timing slack for replacing the first cell with the first replacement cell when the overall power consumption of the first replacement cell is less than the overall power consumption of the first cell; and
replaces the first cell in the circuit design with the first replacement cell based on said determination.

2. The EDA tool of claim 1, wherein replacing the first cell with the first replacement cell comprises:
replacing the first cell with a first intermediate replacement cell, wherein a type of the first intermediate replacement cell is the same as the type of the first cell and a width of the first intermediate replacement cell is greater than the width of the first cell; and
replacing the first intermediate replacement cell with the first replacement cell, wherein the first replacement cell and the first intermediate replacement cell each have the same type and width, and the threshold voltage of the first replacement cell is greater than a threshold voltage of the first intermediate replacement cell.

3. The EDA tool of claim 1, wherein the processor further selects a second replacement cell from the technology library when the timing slack is not available for replacing the first cell with the first replacement cell, wherein a type of the second replacement cell is the same as the type of the first replacement cell and a width of the second replacement cell is greater than the width of the first replacement cell.

4. The EDA tool of claim 3, wherein the processor further:
compares an overall power consumption of the first cell and the second replacement cell;
determines availability of timing slack for replacing the first cell with the second replacement cell when the overall power consumption of the second replacement cell is less than the overall power consumption of the first cell; and
replaces the first cell with the second replacement cell based on said determination of availability of timing slack.

5. The EDA tool of claim 1, wherein the processor further determines availability of timing slack for replacing a second cell of the first timing path when the overall power consumption of the first replacement cell is greater than the overall power consumption of the first cell.

6. The EDA tool of claim 1, wherein the processor replaces the first cell with a third replacement cell when the timing slack is available for replacing the first cell, wherein a type of the third replacement cell is the same as the type of the first cell and a threshold voltage of the third replacement cell is greater than the threshold voltage of the first cell.

7. The EDA tool of claim 1, wherein each of the plurality of cells includes at least one of an AND gate, an OR gate, a NOT gate, a NOR gate, a NAND gate, an XOR gate, an XNOR gate, and a combinational logic cell.

8. A method for reducing leakage power of an electronic circuit design by using an electronic design automation (EDA) tool, wherein the circuit design includes a plurality of timing paths and each timing path includes a plurality of cells, and wherein the EDA tool includes a memory that stores the circuit design and a processor in communication with the memory, the method comprising:
selecting a first timing path of the plurality of timing paths;
determining availability of timing slack for replacing a first cell of the first timing path;
choosing a first replacement cell from a technology library of the EDA tool when the timing slack is not available, wherein a type of the first replacement cell is the same as a type of the first cell and a width and threshold voltage of the first replacement cell are greater than a width and threshold voltage of the first cell;
comparing an overall power consumption of the first cell and the first replacement cell;
determining availability of timing slack for replacing the first cell with the first replacement cell when the overall power consumption of the first replacement cell is less than the overall power consumption of the first cell; and
replacing the first cell with the first replacement cell based on said determination of availability of timing slack for replacing the first cell with the first replacement cell.

9. The method of claim 8, wherein replacing the first cell with the first replacement cell comprises:
replacing the first cell with a first intermediate replacement cell, wherein a type of the first intermediate replacement cell is the same as the type of the first cell and a width of the first intermediate replacement cell is greater than the width of the first cell; and
replacing the first intermediate replacement cell with the first replacement cell, wherein the first replacement cell and the first intermediate replacement cell each have the same type and width, and the threshold voltage of the first replacement cell is greater than a threshold voltage of the first intermediate replacement cell.

10. The method of claim 8, further comprising choosing a second replacement cell from the technology library when the timing slack is not available for replacing the first cell with the first replacement cell, wherein a type of the second replacement cell is the same as the type of the first replacement cell and a width of the second replacement cell is greater than the width of the first replacement cell.

11. The method of claim 10, further comprising:
comparing an overall power consumption of the first cell and the second replacement cell;
determining availability of timing slack for replacing the first cell with the second replacement cell when the overall power consumption of the second replacement cell is less than the overall power consumption of the first cell; and replacing the first cell with the second replacement cell.

12. The method of claim 8, further comprising determining availability of timing slack for replacing a second cell in the first timing path when the overall power consumption of the first replacement cell is greater than the overall power consumption of the first cell.

13. The method of claim 8, further comprising replacing the first cell with a third replacement cell, when the timing slack is available for replacing the first cell, wherein a type of the third replacement cell is the same as the type of the first cell and a threshold voltage of the third replacement cell is greater than the threshold voltage of the first cell.

14. The method of claim 8, wherein each of the plurality of cells includes at least one of an AND gate, an OR gate, a NOT gate, a NOR gate, a NAND gate, an XOR gate, an XNOR gate, and a combinational logic.

* * * * *